United States Patent [19]

Ichihara

[11] Patent Number: 5,255,288
[45] Date of Patent: Oct. 19, 1993

[54] ARRANGEMENT FOR CONVERTING BINARY INPUT SIGNAL INTO CORRESPONDING IN-PHASE AND QUADRATURE PHASE SIGNALS

[75] Inventor: Masaki Ichihara, Tokyo, Japan

[73] Assignee: NEC Corporation, Tokyo, Japan

[21] Appl. No.: 648,758

[22] Filed: Jan. 31, 1991

[30] Foreign Application Priority Data

Jan. 31, 1990 [JP] Japan .................................. 2-20659

[51] Int. Cl.$^5$ .................... H04L 27/12; H03K 7/06
[52] U.S. Cl. .................................. 375/64; 375/67;
371/37.8; 307/471; 332/104
[58] Field of Search ............... 375/39, 59, 60, 61,
375/64, 67; 371/37.8, 42; 307/471, 480;
332/104, 106, 170

[56] References Cited

U.S. PATENT DOCUMENTS

| | | | |
|---|---|---|---|
| 4,686,688 | 8/1987 | Chung et al. | 375/67 |
| 4,748,641 | 5/1988 | Dapper | 375/61 |
| 4,868,428 | 9/1989 | Cooper | 375/61 |

FOREIGN PATENT DOCUMENTS 0169612  1/1986  European Pat. Off. .

OTHER PUBLICATIONS

European Search Report, dated Mar. 11, 1992.

*Primary Examiner*—Curtis Kuntz
*Assistant Examiner*—Young Tse
*Attorney, Agent, or Firm*—Sughrue, Mion, Zinn, Macpeak & Seas

[57] ABSTRACT

In order to effectively reduce a memory size of each of two memories provided in an arrangement for converting a binary input data into the corresponding inphase and quadrature signals, a memory output controller and a sequential logic are provided. The memory output controller includes two polarity control circuits and two input data selectors. The two polarity control circuits are respectively coupled to the two memories, while the two input data selectors are preceded by and coupled to both of the two polarity control circuits. Each of the two polarity control circuits reverses the polarity of the output of the associated memory according to the output of the sequential logic. On the other hand, each of the two input data selectors is arranged to selectively acquire the outputs of the two polarity control circuits depending on the output of the sequential logic.

3 Claims, 5 Drawing Sheets

ARRANGEMENT FOR CONVERTING BINARY INPUT SIGNAL INTO CORRESPONDING IN-PHASE AND QUADRATURE PHASE SIGNALS

BACKGROUND OF THE INVENTION

1. Field of the Invention

The present invention relates to an arrangement for converting a binary input signal into corresponding inphase and quadrature phase signals, and more specifically to an arrangement suitable for use in GMSK (Gaussian minimum shift keying) modulation.

2. Description of the Related Art

It is known in the art to use an arrangement as shown in FIG. 1 to convert a binary input signal into inphase and quadrature baseband signals for GMSK quadrature modulation.

Before discussing the arrangement illustrated in FIG. 1 detail it is deemed advantageous to briefly discuss the principle underlying the same.

It is known that a phase $\phi(t)$ of a GMSK modulating signal is represented by equation (1).

$$\phi(t) = \pi/4T \sum_{i=-\infty}^{\infty} a_i \int_{t=0}^{t} erf\{1/\sqrt{2}\ \sigma(\tau/T - i + \tfrac{1}{2})\} - erf\{1/\sqrt{2}\ \sigma(\tau/T - i - \tfrac{1}{2})\}d\tau \quad (1)$$

wherein
T: bit period;
$d_i$: i-th incoming data [0, 1];
$a_i$: i-th symbol $[+1, -1](=1 - 2d_i)$;

$$\sigma = \sqrt{Ln(2)}\ /2\pi BT;$$

B: 3 dB cut-off frequency of GMSK baseband filter; and $$erf(x)(\text{error function}) = 2/\sqrt{\pi} \int_0^x \exp[(-z^2)]dz$$

Equation (1) can be approximated as equation (2).

$$\phi(t) = \sqrt{2}\ \sigma\pi/4 \sum_{i=-M}^{M} a_i \int_{1/\sqrt{2}\ \sigma(t/T - i - \frac{1}{2})}^{1/\sqrt{2}\ \sigma(T/T - i + \frac{1}{2})} (erf(x) + 1)dx + \pi/2 \sum_{i=-\infty}^{-M-1} a_i \quad (2)$$

wherein M is an appropriate natural number.

If $M \geq 2$, a phase error using the approximation equation (2) is very small (viz., within $\pm 0.2°$). Equation (2) can be rewritten using a given positive integer k indicating the number of data as follows.

$$\phi_k(t) = \sqrt{2}\ \sigma\pi/4 \sum_{i=-M}^{M} a_{k+i} \int_{1/\sqrt{2}\ \sigma(t/T - i - k - \frac{1}{2})}^{1/\sqrt{2}\ \sigma(t/T - i - k + \frac{1}{2})} (erf(x) + 1)dx + \pi/2 \sum_{i=-\infty}^{k-M-1} a_i \quad (3)$$

where $T(k-\tfrac{1}{2}) < t < T(k+\tfrac{1}{2})$.

$\phi_k(t)$ represents a phase of a symbol $a_k$, viz., the phase during a time duration defined between $T(k-\tfrac{1}{2})$ and $T(k+\tfrac{1}{2})$.

Designating the first and second terms of equation (3) by $X_k(t)$ and $Y_k$ respectively, the following equation is given $$\phi_k(t) = X_k(t) + Y_k \quad (4)$$

It is understood from equation (3) that $X_k(t)$ is determined by $a_k$ and N symbols preceding and following $a_k$ (viz., (N+1) symbols in total). That is to say, $X_k(t)$ is determined by $d_k$ and the M-bit preceding and following $d_k$ (Viz., (M+1)-bit in total). On the other hand, $Y_k$ can be represented by $$Y_k = Y_{k-1} + (\pi/2)a_{k-M-1} \quad (5)$$

Accordingly, $Y_k$ is defined by the past status of a symbol and hence becomes uncertain depending on initial conditions. However, the GMSK modulation is in fact implemented by a phase difference between adjacent symbols and therefore, there is no need for considering the absolute value of each phase. This means that if $Y_k$ satisfies the difference equation (5), the initial value thereof can be set to an arbitrary one. Since $a_i$ takes an either value of $+1$ or $-1$, if the initial value is assumed 0, $Y_k$ assumes one of the four values as shown in the following.

$$Y_k = 0,\ \pm\pi/2,\ \pi\ (\text{radian}) \quad (6)$$

Let us introduce two 2-bit variables of state $P_k$, $q_k$ and have $Y_k$ correspond to them as follows.

$$\begin{aligned}
Y_k &= 0 &\rightarrow&\ p_k = 0,\ q_k = 0 \\
Y_k &= \pi/2 &\rightarrow&\ p_k = 0,\ q_k = 1 \\
Y_k &= \pi &\rightarrow&\ p_k = 1,\ q_k = 0 \\
Y_k &= -\pi/2 &\rightarrow&\ p_k = 1,\ q_k = 1
\end{aligned} \quad (7)$$

FIG. 2 is a sketch showing the transitions of the state of $Y_k$ which can be obtained from equations (5) and (7). In FIG. 2, the values of $Y_k$ (0, $+\pi/2$, $\pi$ and $-\pi/2$) are respectively indicated within circles. It is understood, from equations (3), (4) and FIG. 2, that $\phi_k(t)$ is determined by the following:

(a) $d_k$;
(b) M bits which precede $d_k$;
(c) M bits which follow $d_k$; and
(d) $P_k$ and $q_k$ defined by equation (7).

On the other hand, the in-phase signal ($I_k(t)$) and the quadrature signal ($Q_k(t)$) are given by $$\begin{aligned}
I_k(t) &= \cos\phi_k(t) \\
Q_k(t) &= -\sin\phi_k(t)
\end{aligned} \quad (8)$$

By defining discrete values of time as shown in equation $$t_L = T(k - \tfrac{1}{2}) + (T/N)L + T/2N \quad (9)$$

wherein L is a discrete variable (L=0, 1, ..., (N−1)), and N is a positive integer.

Thus, we obtain $$X_k(t_L) = \sqrt{2}\,\sigma\pi/4 \sum_{i=-M}^{M} a_{k+i} \int_{1/\sqrt{2}\,\sigma(L/N + \frac{1}{2}N - i - 1)}^{1/\sqrt{2}\,\sigma(L/N + \frac{1}{2}N - i)} \{erf(x) + 1\}dx \quad (10)$$

$X_k(t_L)$ is determined by $a_{k-M}, a_{k-M+1}, \ldots, a_k, \ldots, a_{k+M-1}, a_{k+M}$, and L. Accordingly, each of $\phi_k(t_L)$, $I_k(t_L)$ and $Q_k(t_L)$ is determined by $d_{k-M}, d_{k-M+1}, \ldots, d_k, \ldots, d_{k+M-1}, d_{k+M}, P_k, q_k$ and L.

It follows that the in-phase and quadrature signals ($I_k(t_L), Q_k(t_L)$) can be obtained by a binary input data $d_i$ using two ROMs which respectively store $$I_k(t_L) = \cos \phi_k(t_L)$$

$$Q_k(t_L) = \sin \phi_k(t_L).$$

In this case, the data within the ROMs are derived using an address determined by $d_{k-M}, d_{k-M+1}, \ldots, d_k, \ldots, d_{k+M-1}, d_{k+M}, P_k q_k$ and L.

The above-mentioned principle is utilized in configuring the known arrangement shown in FIG. 1 wherein it is assumed that M=2 and N=8.

FIG. 1 will be discussed with reference to FIG. 3. A shift register 20 receives the binary input data $d_i$ via an input terminal 22 in synchronism with a clock signal /A2 and shifts the data $d_i$ according to the clock signal /A2. Throughout the instant specification and claims, the symbol "/" preceding "A2" (for example) denotes an inverted "A2" and corresponds to a bar over "A2" in the drawing. The clock signal /A2 is derived from an output terminal Q2 of an octal counter 24 via an inverter 26.

The shift register 20 outputs $d_{k-2}, d_{k-1}, d_k, d_{k+1}$ and $d_{k+2}$ in this particular case (viz., M=2) from five shift stages, which are inputted to each of two ROMs 28 and 30 as the upper 5 bits (viz., A5, A6, A7, A8 and A9) of a 10-bit address signal (denoted by ADD-28, ADD-30). The ROM 28 pre-stores the data of $\cos \phi_k(t_L)$ while the ROM 30 pre-stores the data of $\sin \phi_k(t_L)$.

The variables of state $P_k$ and $q_k$ are obtained by $$\left.\begin{array}{l} p_k = p_{k-1} \oplus q_{k-1} \oplus d_{k-M-1} \\ q_k = /q_{k-1} \end{array}\right\} \quad (11)$$

wherein $d_{k-M-1}$ equals $d_{k-3}$ (M=2) and $\oplus$ represents a logical operation of exclusive-OR.

A sequential logic 32 is an arrangement for implementing the logical operations given by equation (11) and which includes two exclusive-OR gates 34, 36 and two D-type flip-flops 38, 40. The sequential logic 32 is supplied with $d_{k-2}$ and the timing clock /A2 and outputs the state variables $p_k$ and $q_k$ both of which are applied to the ROMs 28, 30 as address bits A3, A4. The operation of the sequential logic 32 will readily be understood and hence further description thereof will be omitted for brevity.

The octal counter 24 receives, via an input terminal 28, a clock signal CLK whose timing chart is shown in a row labelled CLK in FIG. 3. The counter 24 produces three address bits A0, A1 and A2 at the output terminals Q0, Q1 and Q2, which correspond to the discrete-time variable L and which are applied to the ROMs 28 and 30 as lower 3-bit of the addresses (viz., ADD-28, ADD-30).

FIG. 3 shows a timing chart of each of the above-mentioned signals. For the convenience of a better understanding, a logical equation $p_k = p_{k-1} \oplus q_{k-1} \oplus d_{k-3}$ is inserted in the drawing.

Each of the ROMs 28, 30 output respectively the data according to the addresses ADD-28, ADD-30 applied thereto. Two digital-to-analog converters (DACs) 42, 44 are provided for converting the digital outputs of the ROMs 28, 30 into corresponding analog signals, respectively. The analog signals thus obtained are derived via output terminals 46, 48 to an external circuit (not shown), and are used to modulate a carrier signal as is well known in the art.

However, the aforesaid known technique has encountered the problem in that each of the ROMs 28, 30 must have an undesirably large storage capacity. More specifically, the number of address bits for each of the ROMs 28, 30 is ten (10) in the FIG. 2 arrangement, and hence the number of words required for each of the ROMs 28, 30 reaches 1024-word. In the case where the word length of each of the ROMs 28, 30 is 8-bit, the total number of bits required for the ROMs 28, 30 amounts to 16k-bit. Viz.,:

(1024-word)×(8-bit/word)×2=16k-bit

Accordingly, requiring such a large memory leads to undesirably large memory chip sizes. It is therefore highly desirable to decrease the memory size of each of the ROMs 28, 30 for effectively reducing memory manufacturing costs, etc.

SUMMARY OF THE INVENTION

It is an object of the present invention to provide an arrangement which features an effective reduction of memory size required for each of the ROM(s) provided therein.

In brief, the above object is achieved by an arrangement which includes a memory output controller and a sequential logic. The arrangement is able to effectively reduce a memory size of each of two memories provided in an arrangement for converting a binary input data into the corresponding in-phase and quadrature signals. The memory output controller includes two polarity control circuits and two input data selectors. The two polarity control circuits are respectively coupled to the two memories, while the two input data selectors are preceded by and coupled to both of the two polarity control circuits. Each of the two polarity control circuits reverses the polarity of the output of the associated memory according to the output of the sequential logic. On the other hand, each of the two input data selectors is arranged to selectively acquire the outputs of the two polarity control circuits depending on the output of the sequential logic.

More specifically an aspect of the present invention is an arrangement for converting binary input data into corresponding in-phase and quadrature signals, having: a counter for receiving a first clock signal and counting clock pulses of the first clock signal up to N (N is a natural number). The counter generates a plurality of counter outputs at a given time point. A shift register including a plurality of shift stages from which shifted data are derived is provided, the shift register acquiring the binary input data and shifting the same in response to a second clock signal the frequency of which is 1/N of the first clock signal. A first memory section for pre-storing a look-up table including cosine data and receiving an address signal which consists of first bit signals each derived from the shift stages and second bit signals each derived as the counter output from the counter is also provided, the first memory section producing an output defined by the address. A second memory section pre-stores a look-up table including sine data and receives the address signal and produces an output defined by the address. A sequential logic produces outputs in response to both the second clock signal and one of the shifted data of the shift register and an output controller is coupled to receive the outputs of the first and second memory sections. The output controller selectively reverses a polarity of each of the outputs of the first and second memory sections under control of the sequential logic, and selectively directs the outputs of the first and second memory sections to first and second output terminals thereof under control of the sequential logic.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A preferred embodiment of the present invention will be discussed with reference to FIGS. 4 and 5.

Before turning to FIGS. 4 and 5 a principle underlying the present invention will be discussed.

As previously mentioned, the in-phase ($I_k(t_L)$) and quadrature ($Q_k(t_L)$) signals are represented by:

$$I_k(t_L) = \cos\phi_k(t_L) \\ = \cos\{X_k(t_L) + Y_k\} \\ Q_k(t_L) = -\sin\phi_k(t_L) \\ = -\sin\{X_k(t_L) + Y_k\} \quad (12)$$

wherein $Y_k = 0, \pm\pi/2$ or $\pi$.
$Y_k$ corresponds to the variables of state $p_k, q_k$ as shown in equation (7). Equation (12) can be rewritten as follows:

$$I_k(t_L) = \cos X_k(t_L) \cdot \cos Y_k \\ - \sin X_k(t_L) \cdot \sin Y_k \\ Q_k(t_L) = -\cos X_k(t_L) \cdot \sin Y_k \\ - \sin X_k(t_L) \cdot \cos Y_k \quad (13)$$

Accordingly, we obtain the following equation (14) from equations (7) and (13).

$$\begin{aligned} p_k = 0, q_k = 0 &\rightarrow I_k(t_L) = \cos X_k(t_L) \\ & \quad Q_k(t_L) = -\sin X_k(t_L) \\ p_k = 0, q_k = 1 &\rightarrow I_k(t_L) = -\sin X_k(t_L) \\ & \quad Q_k(t_L) = -\cos X_k(t_L) \\ p_k = 1, q_k = 0 &\rightarrow I_k(t_L) = -\cos X_k(t_L) \\ & \quad Q_k(t_L) = \sin X_k(t_L) \\ p_k = 1, q_k = 1 &\rightarrow I_k(t_L) = \sin X_k(t_L) \\ & \quad Q_k(t_L) = \cos X_k(t_L) \end{aligned} \quad (14)$$

It is understood from equation (14) that if a first ROM pre-stores the data of $\cos X_k(t_L)$ while a second ROM pre-stores the data of $\sin X_k(t_L)$, then the I and Q signals can be derived by inverting the outputs of the first and second ROMs and/or by exchanging the outputs thereof, both depending on the variables of state $p_k, q_k$.

Figure 1:
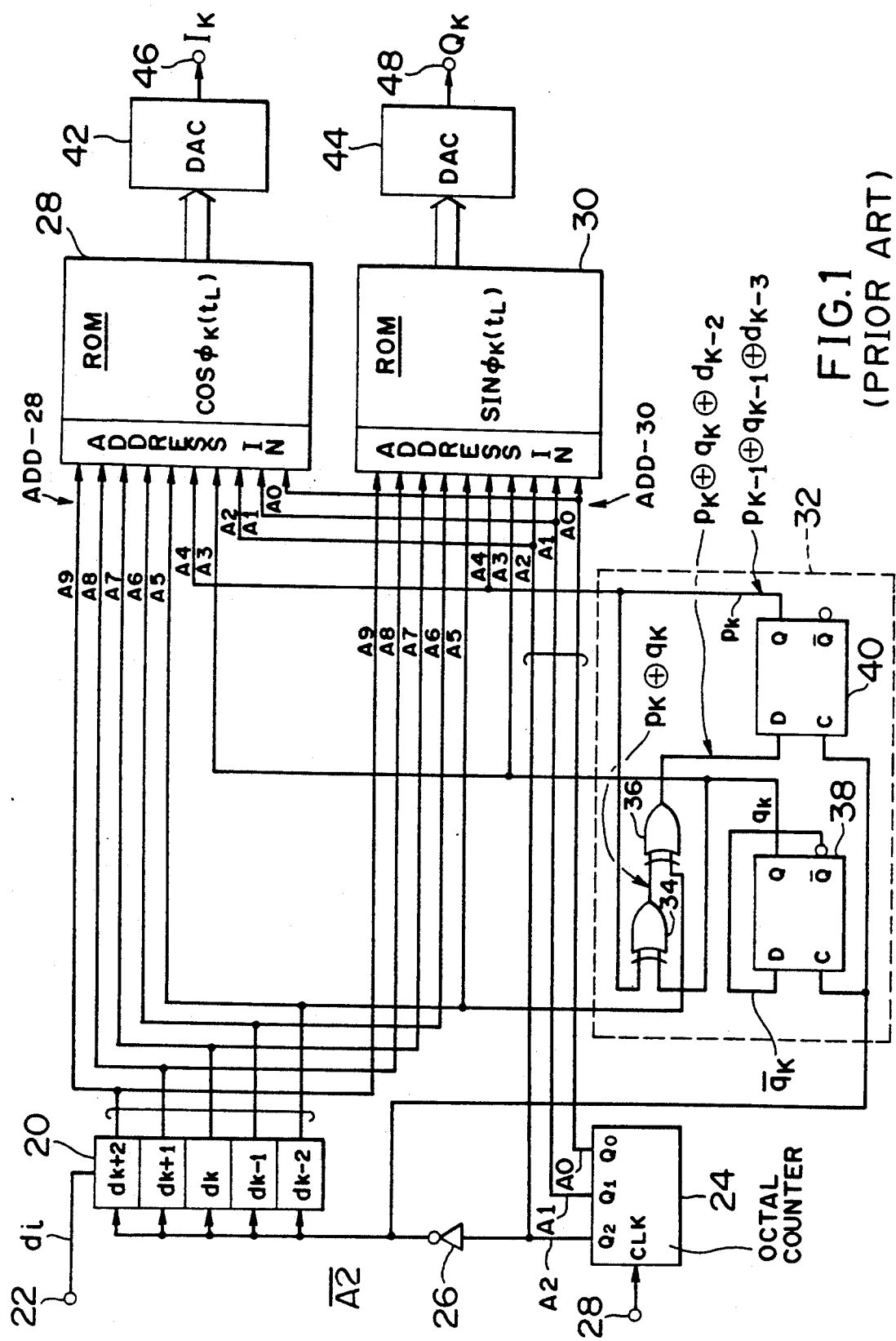
FIG. 1 is a block diagram showing a conventional arrangement for converting a binary input signal into corresponding two in-phase and quadrature signals, referred to in the opening paragraphs.
Figure 4:
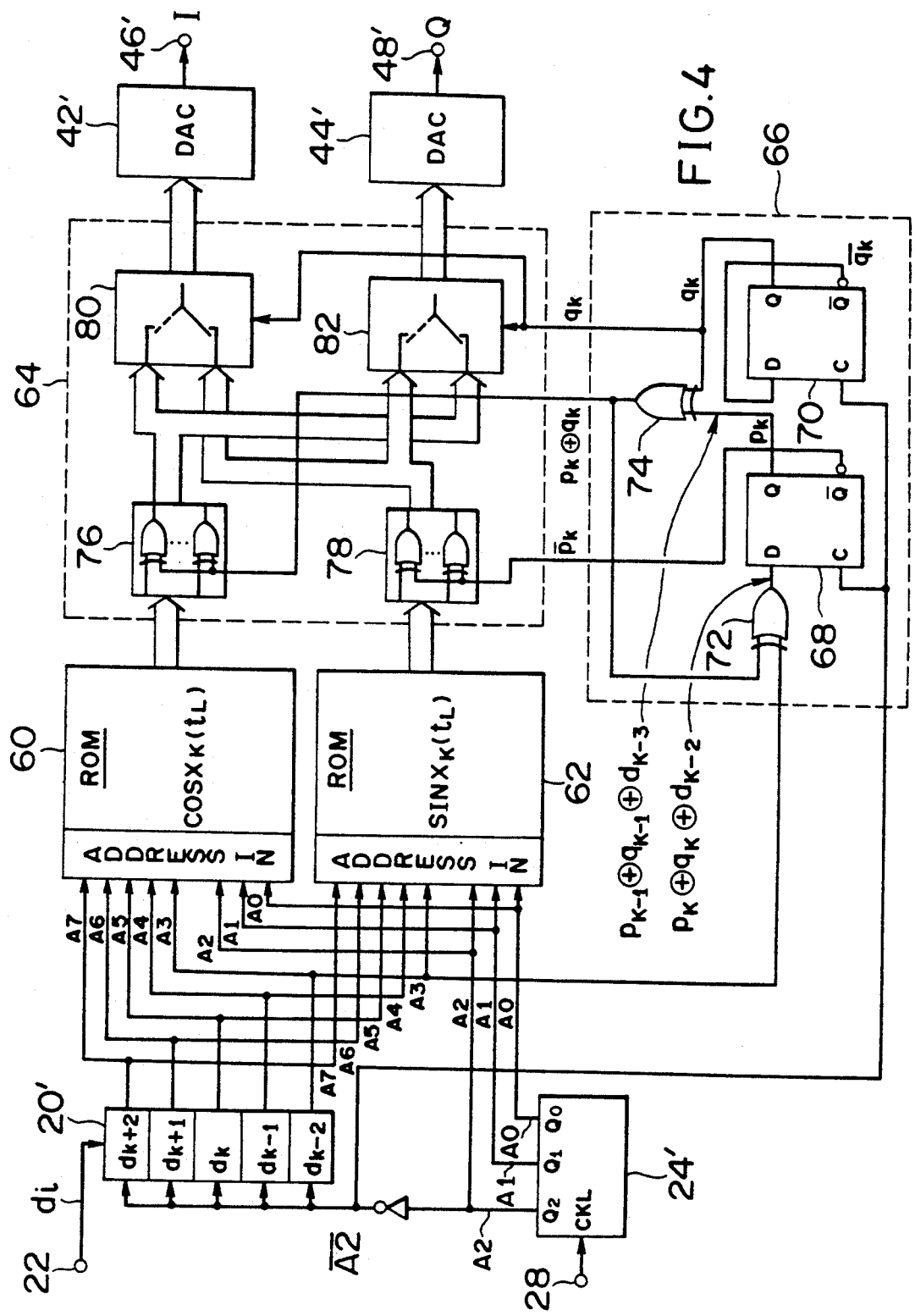
FIG. 4 is a block diagram showing the circuit arrangement which characterizes an embodiment of the present invention.
Figure 5:
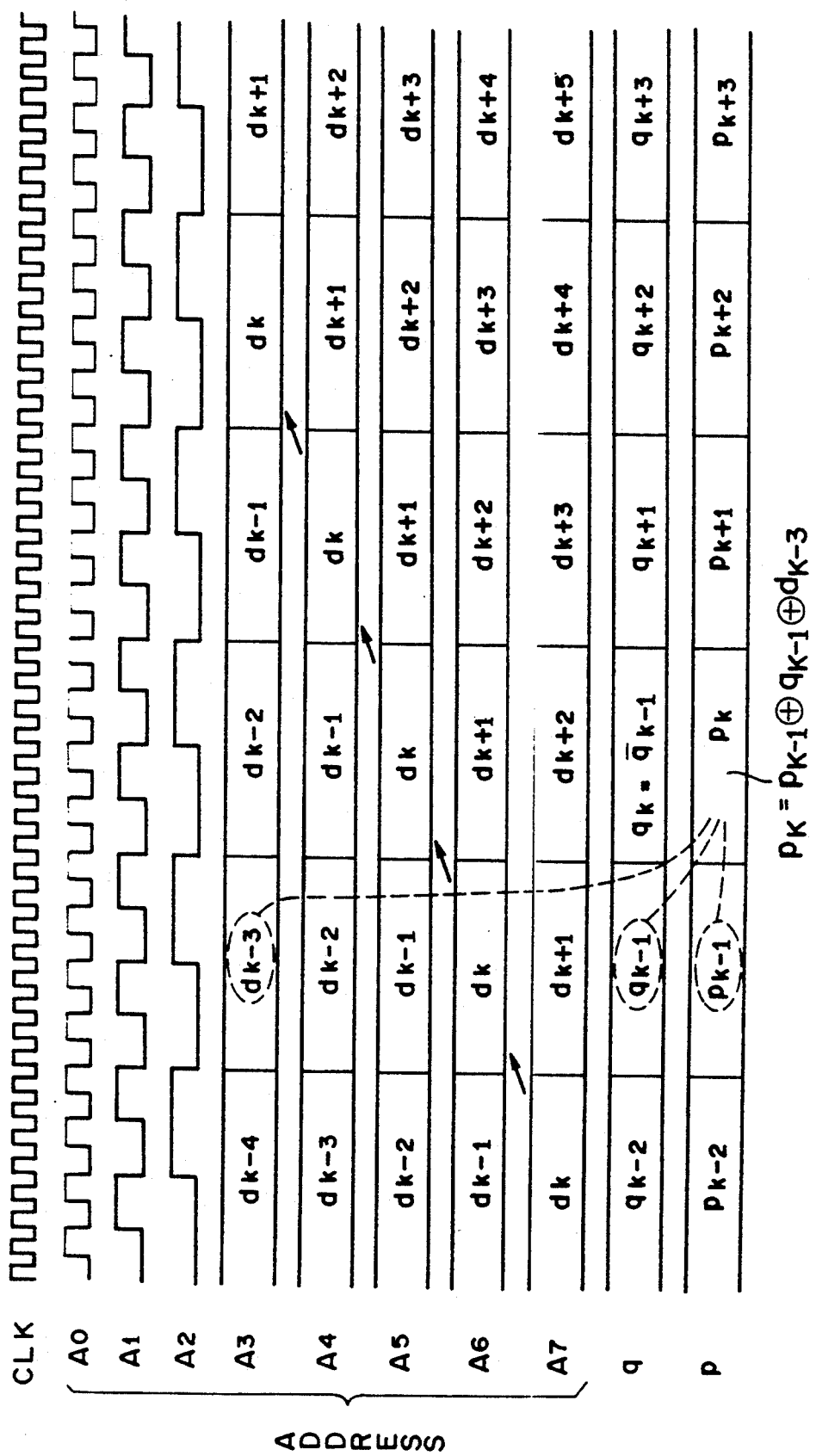
FIG. 5 is a timing chart depicting the operational characteristics of the FIG. 4 arrangement.

The arrangement shown in FIG. 4 is based on the above-mentioned principle as expressed by equation (14), and includes a shift register 20', a counter 24', two ROMs 60 and 62, an output controller 64, a sequential logic 66, and two digital-to-analog converters (DACs) 42', 44'. The blocks 20', 24', 42' and 44' are respectively identical with the blocks 20, 24, 42 and 44 in FIG. 1 and hence will not be discussed in detail for brevity. It should be noted that the FIG. 4 arrangement is configured under the assumption of M=2 and N=8.

The ROMs 60 and 62 respectively pre-store the data of $\cos X_k(t_L)$ and $\sin X_k(t_L)$.

The sequential logic 66 comprises two D-type flip-flops 68, 70 and two exclusive-OR gates 72, 74. As shown, the shifted input data $d_{k-2}$ is applied to one input terminal of the exclusive-OR gate 72, while the clock signal /A2 is applied to a clock terminal of each of the flip-flops 66, 68. The output of the exclusive-OR gate 72 is defined by "$p_k \oplus q_{k-1} \oplus d_{k-2}$", while the output of the exclusive-OR gate 74 is defined by "$p_{k-1} \oplus q_{k-1} \oplus d_{k-3}$".

The output controller 64 includes two output polarity controllers 76, 78 and two input data selectors 80, 82. The polarity controller 76 is supplied with the output of the exclusive-OR gate 74 (viz., $p_k \oplus q_k$) and reverses the output of the ROM 60 in the event that $p_k \oplus q_k = 1$. On the other hand, the polarity controller 78 reverses the output of the ROM 62 in response to the variable of state /$p_k$ which assumes a logic 1 (viz., in the event that $p_k=0$). The polarity controller 76 includes a plurality of exclusive-OR gates arranged in parallel, each of which is supplied with the output of the ROM 60 at one input terminal thereof and each of which is supplied with the above-mentioned $p_k \oplus q_k$. Similarly, the polarity controller 78 includes a plurality of exclusive-OR gates arranged in parallel, each of which is supplied with the output of the ROM 62 at one input terminal thereof and each of which is supplied with the variable of state /$p_k$. The number of the exclusive-OR gates of each of the polarity controllers 76, 78 is equal to the output lines (eight for example) of the associated ROM.

The input data selectors 80, 82 respectively select the outputs of the controllers 76, 78 in the event that the variable of state $q_k$ assumes a logic 0. Otherwise, the selectors 80, 82 respectively select the outputs of the controllers 78, 76.

Figure 2:
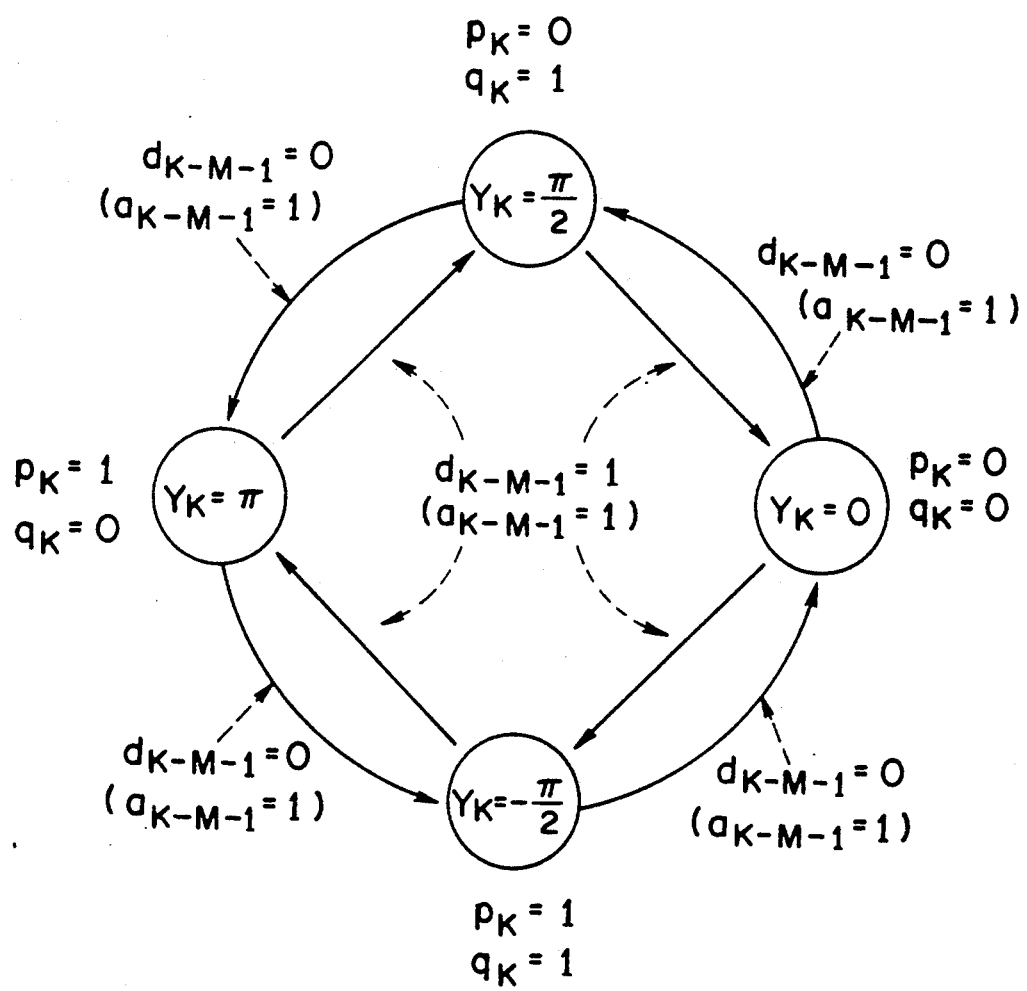
FIG. 2 is a sketch for describing the operation of the FIG. 1 arrangement, referred to in the opening paragraphs.
Figure 3:
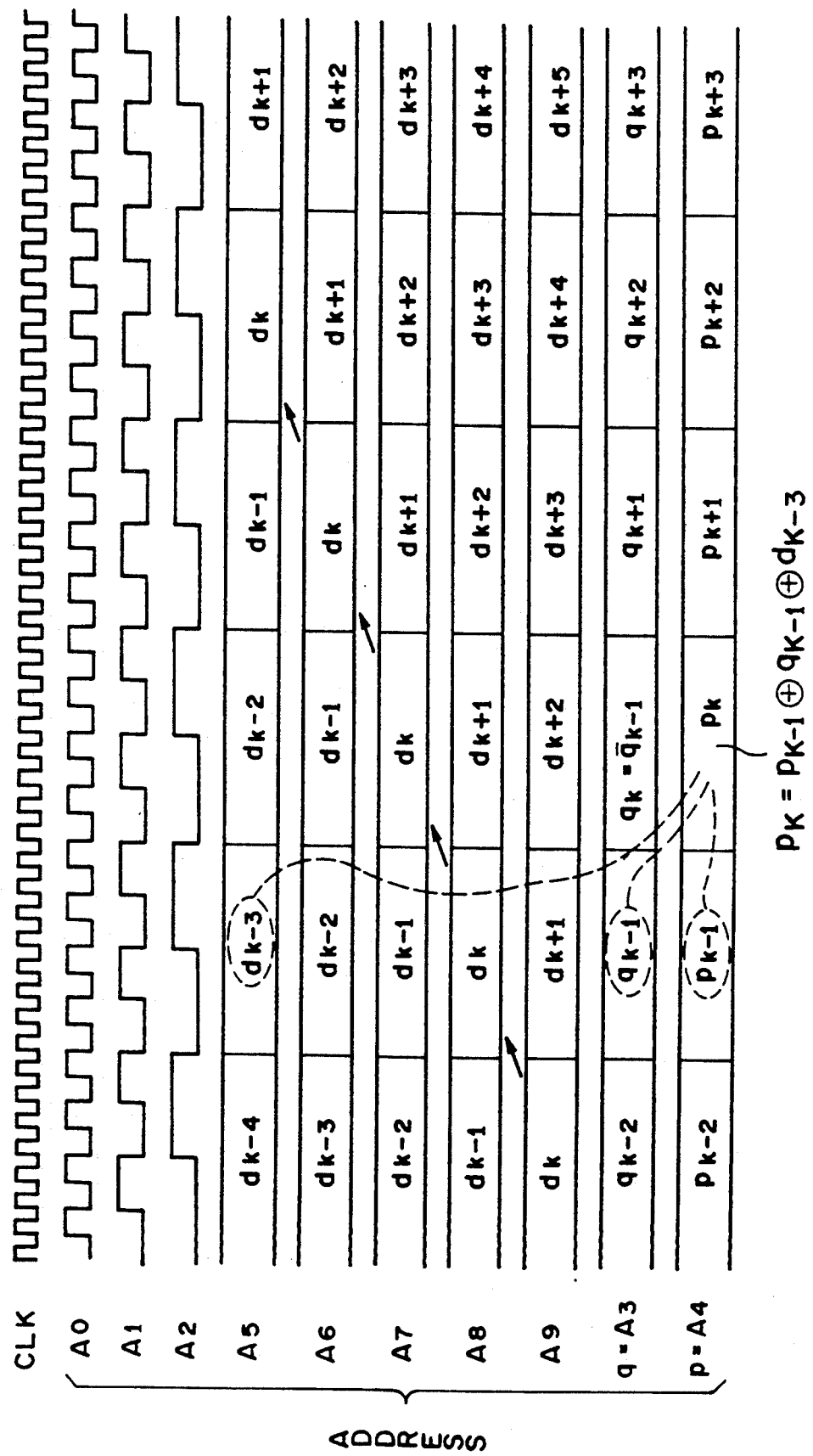
FIG. 3 is a timing chart depicting the operation of the FIG. 1 arrangement, referred to in the opening paragraphs.

It should be noted that each of the ROMs 60, 62 is provided with eight address lines instead of ten lines as in the case of the prior art referred to in connection with the FIG. 2. This means that the memory capacity can be reduced to one-fourth as compared with the above-mentioned conventional device. By way of example, in the event that $M=2$, $N=8$ and the word length is 8-bit, the number of words required is markedly reduced to 256 words from 1024 words in the case of the above-mentioned conventional device. Accordingly, the number of bits required by each of the ROMs 60, 62 is $$256 \text{ words} \times 8 \text{ bits/word} \times 2 = 4k \text{ bits}$$

In the above description, two separate ROMs 60 and 62 are provided. However, it is within the scope of the present invention to prepare a single ROM which includes two memory sections for respectively pre-storing the data of cos $X_k(t_L)$ and sin $X_k(t_L)$. Further, each of the ROMs 60 and 62 can be replaced with a random access memory (RAM), in the case of which the data (cos $X_k(t_L)$, sin $X_k(t_L)$) should be transferred to the associated RAM prior to the operation. Still further, the counter 24' is not limited to a counter which counts up to a multiple of two. The counter 24' may be of a type which counts up an appropriate natural number (N), in which case the shift register 20' operates in synchronism of a clock signal whose frequency is 1/N. FIG. 5 is a timing chart illustrating the timing of the signals illustrated in FIG. 4.

While the foregoing describes only one embodiment according to the present invention, the various alternatives and modifications possible without departing from the scope of the present invention, which is limited only by the appended claims, will be apparent to those skilled in the art.

What is claimed is:

1. An arrangement for converting binary input data into corresponding in-phase and quadrature signals, comprising:
    a counter which receives a first clock signal and counts clock pulses of said first clock signal up to N (N is a natural number), said counter generating, at a given time point, a plurality of counter outputs which includes a second clock signal the frequency of which is 1/N of said first clock signal;
    a shift register which includes a plurality of shift stages from which shifted data are derived, said shift register being coupled to said counter so as to acquire the binary input data and shifting same in response to said second clock signal applied from said counter;
    a first memory section having a look-up table including cosine data pre-stored therein, said first memory section is coupled to said shift register and said counter so as to receive an address signal which consists of first bit signals received from the shift stages and second bit signals received as the counter output from said counter, said first memory section producing an output defined by said address signal;
    a second memory section having a look-up table including sine data pre-stored therein said second memory section being coupled to said shift register and said counter so as to receive said address signal and produce an output defined thereby;
    a sequential logic coupled to said counter and said shift register, said sequential logic producing outputs in response to both said second clock signal and one of the shifted data of said shift register; and
    an output controller which includes first and second output terminals and first and second memory output polarity controllers which are respectively coupled to receive the outputs of said first and second memory sections, said output controller also including first and second input data selectors each of which is coupled to said first and second memory output polarity controllers, said first and second input data selectors also being coupled to said first and second output terminals, said output controller selectively reversing a polarity of each of the outputs of said first and second memory sections under control of said sequential logic, said output controller selectively steering the outputs of said first and second memory sections to said first and second output terminals under control of said sequential logic.

2. An arrangement as claimed in claim 1, wherein said sequential logic includes:
    a first exclusive-OR gate having first and second input terminals and receiving one of the outputs of said shift register at said first input terminal;
    a first D-type flip-flop coupled to receive an output of said first exclusive-OR gate, said first D-type flip-flop applying one of two outputs thereof to said second memory output polarity controller;
    a second exclusive-OR gate having first and second input terminals and receiving the other output of said two outputs of said first D-type flip-flop at the first input terminal thereof, and applying the output thereof to said first memory output polarity controller and to the other input terminal of said first exclusive-OR gate; and
    a second D-type flip-flop coupled to receive one of two outputs thereof and applying the other of the two output thereof to the second input terminal of said second exclusive-OR gate and to said first and second input data selectors.

3. An arrangement as claimed in claim 1, wherein said first and second memory sections are included in a single memory unit.

* * * * *